United States Patent
Larsson

(10) Patent No.: US 8,330,288 B2
(45) Date of Patent: Dec. 11, 2012

(54) DEVICE FOR CHARGING AT LEAST ONE ELECTRICAL BATTERY ON BOARD A BOAT

(76) Inventor: Stefan Larsson, Göteborg (SE)

(*) Notice: Subject to any disclaimer, the term of this patent is extended or adjusted under 35 U.S.C. 154(b) by 2264 days.

(21) Appl. No.: 10/472,703

(22) PCT Filed: Mar. 20, 2002

(86) PCT No.: PCT/SE02/00526
§ 371 (c)(1),
(2), (4) Date: Oct. 7, 2009

(87) PCT Pub. No.: WO02/078148
PCT Pub. Date: Oct. 3, 2002

(65) Prior Publication Data
US 2011/0049882 A1  Mar. 3, 2011

(30) Foreign Application Priority Data
Mar. 23, 2001 (SE) ........................ 0101011

(51) Int. Cl.
*F03B 13/00* (2006.01)
*B63H 21/17* (2006.01)
(52) U.S. Cl. ................ 290/54; 290/43; 440/6
(58) Field of Classification Search ............ 290/43, 290/54; 440/6
See application file for complete search history.

(56) References Cited

U.S. PATENT DOCUMENTS

| | | | | |
|---|---|---|---|---|
| 1,898,973 A * | 2/1933 | Lansing | ........................ | 440/6 |
| 3,999,499 A * | 12/1976 | Kitabayashi | ................ | 114/74 T |
| 4,102,291 A * | 7/1978 | Sebald | ........................ | 114/244 |
| 6,508,191 B1* | 1/2003 | Spoljaric | ..................... | 114/244 |
| 7,146,918 B2* | 12/2006 | Meller | ..................... | 114/39.26 |
| 7,298,056 B2* | 11/2007 | Gizara | ........................ | 290/54 |
| 7,492,054 B2* | 2/2009 | Catlin | ........................ | 290/54 |
| 8,102,071 B2* | 1/2012 | Catlin | ........................ | 290/54 |
| 2004/0152373 A1* | 8/2004 | Larsson | ........................ | 440/6 |
| 2006/0061107 A1* | 3/2006 | Cadaret | ........................ | 290/44 |

FOREIGN PATENT DOCUMENTS

| DE | 4105318 | 8/1992 |
|---|---|---|
| FR | 2522732 | 9/1983 |

OTHER PUBLICATIONS

Patent Abstracts of Japan, Abstract of JP 12-47741, Feb. 18, 2000.

* cited by examiner

*Primary Examiner* — Nicholas Ponomarenko
(74) *Attorney, Agent, or Firm* — Dilworth & Barrese, LLP

(57) ABSTRACT

A device for charging at least one electric battery (1) on board a boat comprises a propeller (2) adapted to immersed in water through the movement of the boat be driven to rotate a axle (3) and an electric direct current machine (8) connected to the axle and adapted to generate voltage to the battery for charging thereof upon rotation of the axle. A DC/DC-converter (7) is arranged to convert the voltage generated by the electric machine through the rotation of the axle to a higher voltage suited for charging the battery. A member (10) is adapted to measure the voltage generated by the electric machine and a micro processor unit (9) is adapted to control the DC/DC-converter on the basis of voltage data delivered by said member.

20 Claims, 3 Drawing Sheets

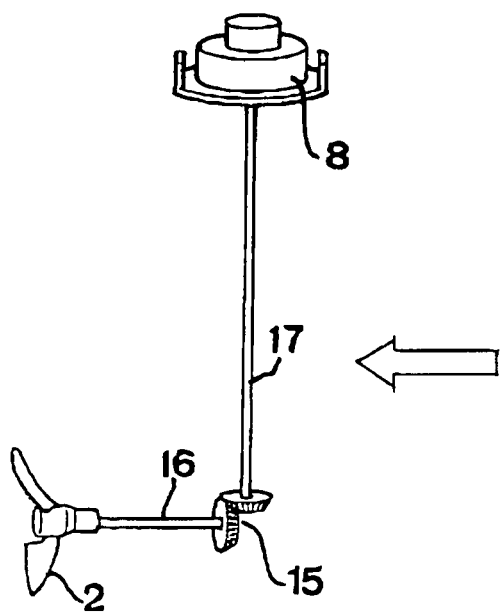
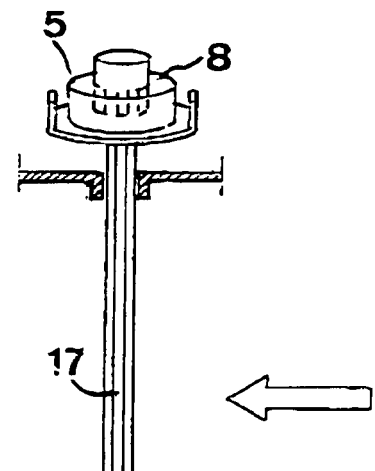
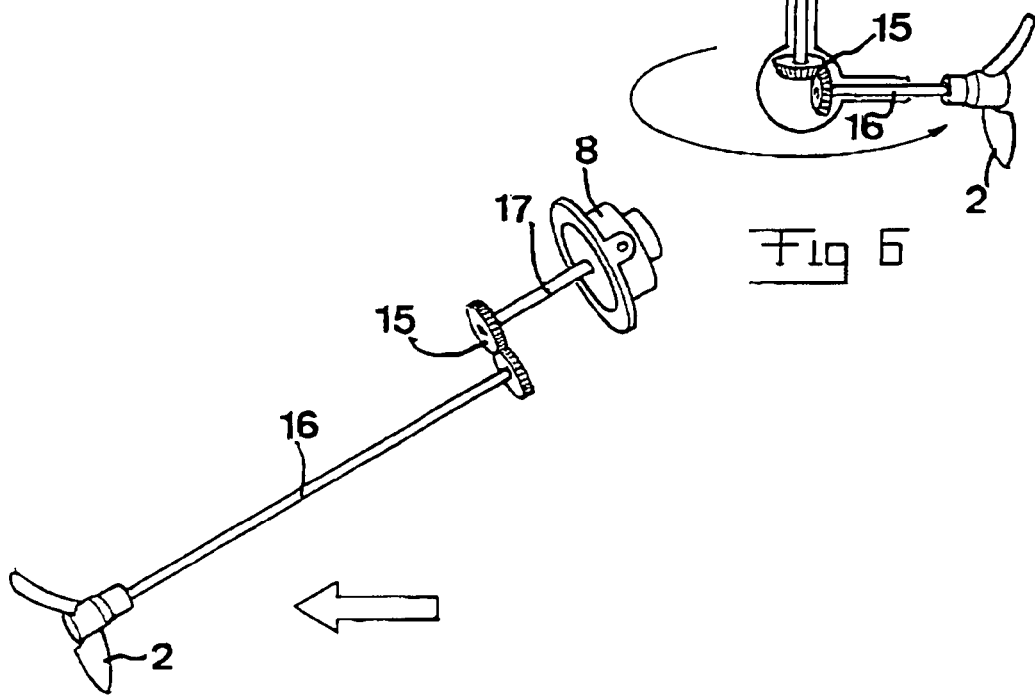
Fig 5
Fig 6
Fig 7

DEVICE FOR CHARGING AT LEAST ONE ELECTRICAL BATTERY ON BOARD A BOAT

FIELD OF THE INVENTION AND PRIOR ART

The present invention relates to a device for charging at least one electric battery on board a boat, which comprises a propeller adapted to immersed into water through the movement of the boat be driven to rotate an axle and an electric direct current machine connected to the axle and adapted to generate voltage to the battery for charging thereof upon rotation of the axle.

It is of course possible to charge such a battery for using the electrical energy of the battery for all types of objects, but the case of utilizing this electrical energy for propelling the boat in question will hereinafter be discussed for illuminating the invention, but accordingly not in any way for restriction thereof. The boat is then preferably a sailing boat having an electrically directly driven propelling system, which makes it possible to generate electric energy through said propeller when sailing. It is conceivable to use the electrical energy for propelling the sailing boat, for example in harbours, at bad wind or for increasing the propelling force emanating from the sails through motor operation of the electric direct current machine.

A problem with this type of devices is that the number of revolutions of said axle would mostly be too low for being able to deliver a sufficiently high voltage from the direct current machine so as to charge the battery. In these cases standard batteries of 12 volts are usually used, which normally means that a voltage over 14 volts is needed for charging the battery completely. However, the generated voltage is almost proportional to the number of revolutions of the propeller axle. More exactly, 50 revolutions/minute are normally required per volt. As a consequence of slip in different directions on one hand when sailing and charging and on the other when propelling by means of said propeller the difference in number of revolutions between charging and propelling at a given speed of the boat gets in the order of 1:3. Thus, a number of revolutions of 600 revolutions/minute may typically be required for driving the boat with a speed of 3 knots through said motor, while at a sailing speed of 3 knots the propeller will only rotate 200 revolutions/minute, which would then result in a voltage of 4 volts out from the direct voltage machine, which would be far too low for enabling charging of the battery.

In a device of this type already known the blades of said propeller have for that sake been made adjustable between different pitching positions, so that a higher number of revolutions may be obtained when charging with respect to if the blade pitch at charging would be the one being an optimum for utilizing the propeller for propelling. This results then in a higher voltage out from the direct current machine, so that the battery may be charged. However, a propeller with a mechanic connection to the blade gets in this solution necessary, and such a propeller gets complicated and costly, besides the fact that the risk for failure increases remarkably with respect to a propeller with the same position for charging and propelling.

SUMMARY OF THE INVENTION

The object of the present invention is to provide a device of the type defined in the introduction, in which the drawbacks mentioned above of such devices already known have been reduced to a large extent.

This object is according to the invention obtained in such a device by also arranging a DC/DC-converter adapted to convert the voltage generated by the electric machine through the rotation of the axle to a higher voltage suited for charging the battery, a member adapted to measure the voltage generated by the electric machine and a micro processor unit adapted to control the DC/DC-converter on the basis of voltage data delivered by said member.

By utilizing a DC/DC-converter and control this in dependence of the voltage delivered by the electric machine operating as generator a suitable charging voltage for charging the battery or the batteries may be obtained in a very reliable and advantageous way. Thus, no propeller with any mechanic connection to the blades is required, but it may look the same when it is possibly used for propelling the boat. The possibility to use a propeller in the same position when charging and propelling is accordingly provided through the invention, but it is pointed out that it is not necessary that the propeller also has to be used for propelling.

According to a preferred embodiment of the invention the electronic unit is adapted to calculate the maximum set value for the current out from the electric machine towards the battery on the basis of data concerning the voltage generated by the electric machine delivered by said member and control the DC/DC-converter to adjust the charging voltage to the battery for obtaining said maximum current set value. The battery may in this way be charged in an optimum way, since the voltage generated by the electric machine is proportional to the number of revolutions of the propeller, which is substantially proportional to the power to be transferred, and by making the current depending upon the voltage generated in this way the battery may be charged efficiently. Thus, a higher voltage generated from the electric machine enables a higher possible value of the current out from the electric machine towards the battery, and this is controlled by the fact that the DC/DC-converter adjusts the charging voltage to the battery to be somewhat higher. On the other may at a comparatively low voltage generated by the electric machine only a low charging current be allowed.

According to another preferred embodiment of the invention the device comprises members for measuring the current from the electric machine and delivering information thereabout to the electronic unit. It may by this be checked that the actual current value corresponds to the desired current set value and a regulation towards this may take place.

According to another preferred embodiment of the invention the device comprises a control actuated by hand for adjusting the current output from the electric machine by adjusting said current set value to be within an interval for a given voltage delivered by the electric machine. It may be the case that it is desired to charge the battery as quickly as possible and not consider so much that the movement of the boat is retarded quite a lot through the power transmitted through the propeller. The regulation is then carried out so that the current set value is adjusted to be as high as possible within said interval. However, would it be interesting not to retard the boat too much, for example since the batteries are almost full charged or since a mate driving with another sailing boat takes place and it is not desired to be left behind, it may then instead by chosen to be in the lower part of the maximum current interval.

According to another preferred embodiment of the invention the microprocessor unit is adapted to control the charging voltage to the battery so that a maximum charging power is obtained, so called Power Point-regulation. The Power Point-regulator searches continuously the current value for the direct current machine resulting in the highest charging power. By combining Power Point-regulation with the control for influencing the maximum current set value a desired maximum speed reduction may be checked by hand. It has turned out that an amount of circumstances influences the charging performance, such as the inclining angle of the propeller axle, the inclining of the boat, the movement of the boat with respect to the water, drift and the state of the propeller. These deviations from the ideal case means that a maximum current and braking from the direct voltage machine will not always give the maximum charging power to the battery. The lower current from the direct voltage machine gives less braking force on the boat and a higher speed and number of revolutions of the propeller, which is a higher output voltage from the direct current machine and may result in a higher charging power to the battery (POWER=Voltage×Current).

According to another preferred embodiment of the invention the micro processor unit is adapted to activate the charging of the battery only if the voltage delivered by the electric machine exceeds a threshold voltage value, or considerable disturbance of the sailing properties are probable, for instance when cruising, and the maximum possible generated energy is low, it has more exactly turned out that such a threshold voltage value is within the interval 3-6 volts, preferably at about 4.5 volts.

Another preferred embodiment of the invention comprises an automatic switching on and switching off of the electronic unit when the threshold voltage has been obtained or nearly been obtained. No button actuation for switching on and switching off is required in this way.

According to another preferred embodiment of the invention the device comprises members adapted to measure the voltage of the battery and send information thereabout to the micro processor unit, and the micro processor unit is adapted to control the DC/DC-converter so that a predetermined overcharging level of the voltage on the battery is not exceeded. This is important for protecting the battery, at the same time as it is of course stupid to retard the movement of the boat unnecessarily.

According to another preferred embodiment of the invention said propeller is a so-called folding propeller, i.e. the propeller blades may be folded out and folded together for changing between a position, in which they co-operate with the water for transferring power and a position without such co-operation. The retarding influence of the device upon the movement of the boat may hereby be reduced to a minimum during periods of time when no charging is desired and a maximum sailing speed is aimed at. The combination of maximum current set value and threshold voltage makes it normally even possible to charge and cruise with the folding propeller without folding the propeller together.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings:

FIGS. 5-7 are simplified views illustrating other possible designs of the power transfer between the propeller and the electric machine in devices according to the invention.

DETAILED DESCRIPTION OF PREFERRED EMBODIMENTS OF THE INVENTION

Figure 1:
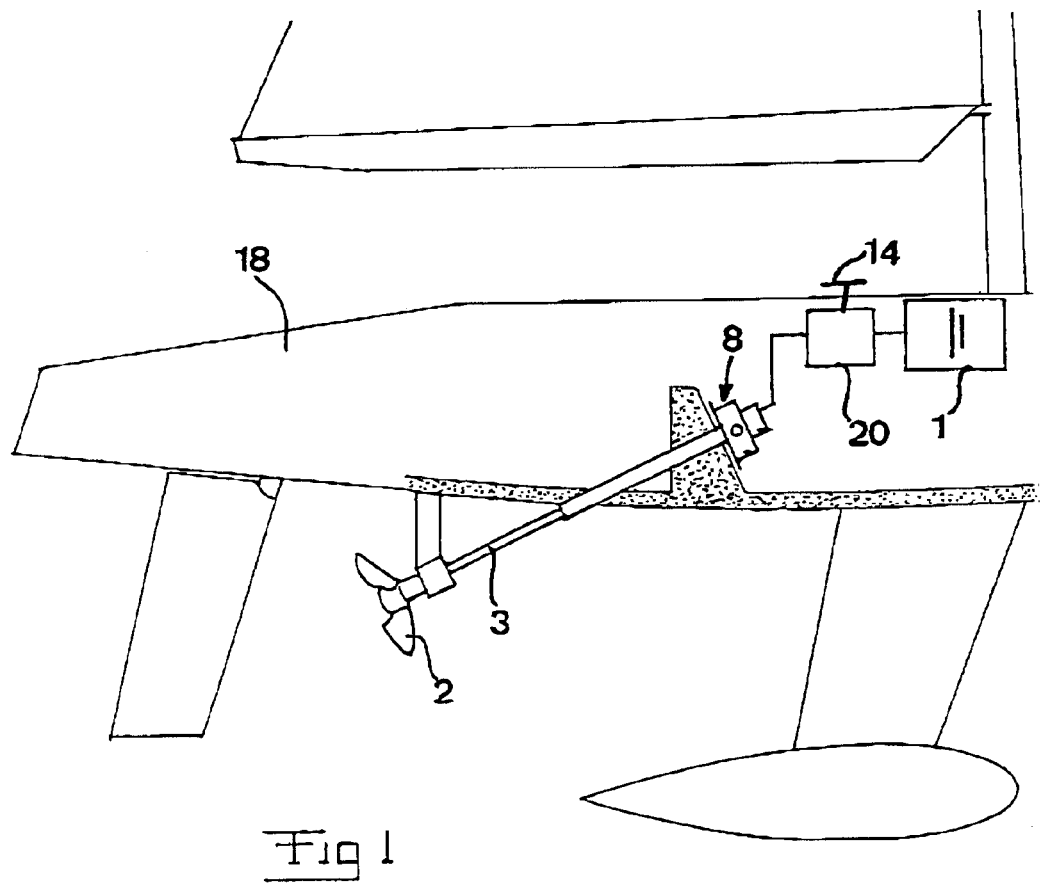
FIG. 1 is a schematic view illustrating the general construction of a device according to the invention.

The overall construction of a device for charging at least one electric battery on board a boat is illustrated in FIG. 1. It is preferably a question of a plurality of 12 volts batteries 1 intended to be used both for propelling the boat 18 and for supply of electricity to other equipment on board, such as refrigerator, lightening, autopilote and the like. The device comprises a propeller 2 adapted to be immersed in water and then through the movement of the boat be driven to rotate an axle 3 connected thereto. The axle 3 is in its turn connected to a rotor of an electric direct current machine. The direct current machine is preferably a permanent magnet machine, but other types of direct current machines are also conceivable, even if a permanent magnet machine is very advantageous thanks to the high energy density thereof. Other conceivable electric direct current machines are series motors and shunt motors. Through the rotation of the rotor a voltage is as usual generated in the windings of the rotor of the machine. The magnitude of this voltage depends upon the number of revolutions of the propeller, and it is more exactly about 1 volt per 50 revolutions/minute. The current from the collector on the rotor is through slip contacts transferred to the cable.

The device comprises also a DC/DC-converter 7 adapted to transform the voltage delivered by the electric machine 8 to a voltage having a suitable level for charging the battery 1. If it is a question of a 12 volts battery a charging voltage of about 14.4 volts is usually required for being able to charge the battery completely.

Figure 2:
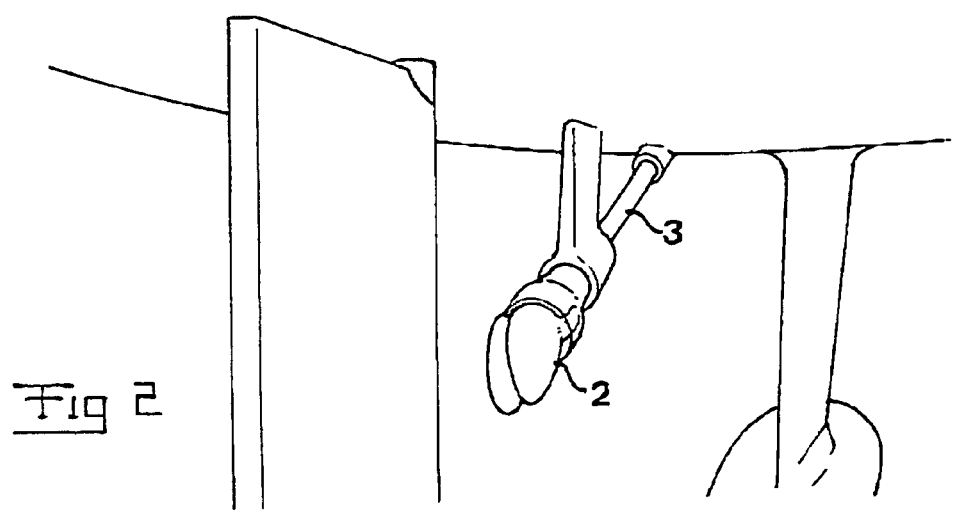
FIG. 2 is a view being enlarged with respect to FIG. 1 of a conceivable propeller of a device according to FIG. 1 in an inactive position.

It is shown in FIG. 2 that the propeller used is preferably a so-called folding propeller, so that the blades thereof may be folded together when no power transmitting co-operation is desired between the water and the propeller. Such a folding propeller pivots the blades thereof outwardly by means of the centrifugal force in motor operation. The blades are kept folded out through the rotation achieved by the water movement when sailing and charging. It is only necessary to initially set the folding propeller into rotation by means of the motor and then not load the direct current machine with a too high current, but according to a suitable maximum set value curve, so that the propeller is not folded together. However, propellers having fixed blades are also conceivable.

Figure 3:
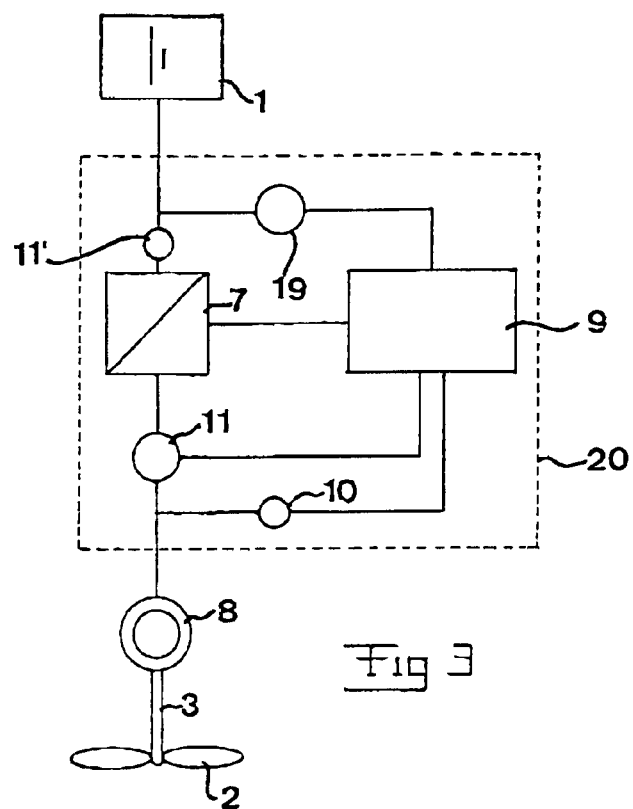
FIG. 3 is a block diagram illustrating the function of a device according to a preferred embodiment of the invention.
Figure 4:
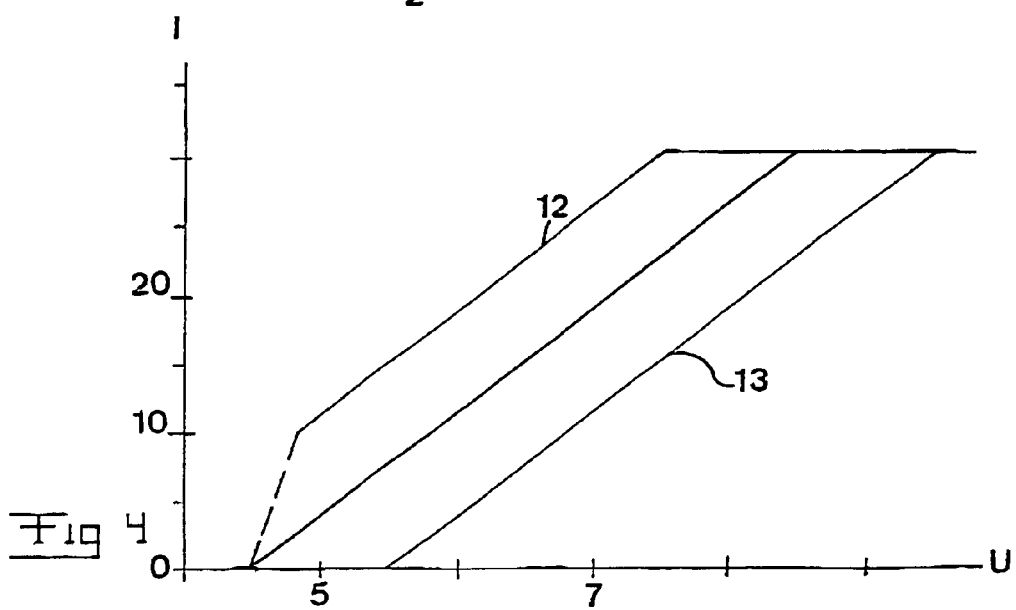
FIG. 4 is a graph of the charging current versus the voltage generated in a device according to the invention.

The function of the device according to the invention is schematically illustrated in FIG. 3, and this shall now be explained while making reference to the graph in FIG. 4 at the same time. The device has a micro processor unit 9 in the form of a programmed control computer adapted to control the DC/DC-converter depending upon the conditions and desires of the charging of the battery, the braking force of the propeller and so on prevailing. The device has also members 10 adapted to measure the voltage generated by the electric machine and send information thereabout to the electronic unit 9, so that this may considering this when controlling the DC/DC-converter 7. The device has also members 11 (they may also be located to measure the battery charging current as indicated by 11', and the actual current of the direct voltage machine is then easily calculated in the micro processor unit) adapted to measure the current from the electric machine and deliver information thereabout to the micro processor unit 9. The device has also members 19 for measuring the battery charging voltage and informing the micro processor unit thereabout, so that the a feedback is obtained between the control of the DC/DC-converter by the micro processor unit and it may also be ensured that the battery charging voltage exceeds a predetermined overcharging level.

It is illustrated in FIG. 4 through a thicker line which charging current I is the one suitable to tap at a given voltage U delivered by the electric machine 8. This charging current is then 0 at 4.5 V, which accordingly constitutes a lower limit, below which the battery is not charged and the propeller rotates without any braking moment. Under the conditions mentioned above this would mean that the number of revolutions of the propeller axle has to be at least 225 revolutions/minute for making charging possible. It may also for example be seen that for a voltage of 7 volts the maximum current out from the direct voltage machine is about 18 A. Upper 12 and lower 13 limits for the maximum output current of the direct voltage machine at a given generated voltage are also shown. The upper limit corresponds in principle to what the propeller may "withstand" without making the propeller inefficient and so that it "clears off" or moves the folding propeller so that it is folded together, while the lower limit shows a low braking moment and a high number of revolutions of the propeller, but charging of the battery is still obtained if the higher threshold voltage has been achieved. The voltage U is of course influenced by where in the interval it is chosen to be, since the braking force on the propeller is depending upon the current output in the direct voltage machine. If for example the current at a charging voltage of 7 volts is increased from 18 A to 23 A the voltage will then also sink somewhat, maybe to 6.8 V. Thus, by controlling the loading moment on the propeller the power output may be adapted to the speed of the boat through the water for influencing the sailing properties to a minimum.

The function of the device according to the invention is the following:

When the speed of the boat is sufficiently high when sailing, usually at least 3 knots for being able to obtain a number of revolutions of the propeller being sufficiently high for charging the battery, the propeller may when desired be brought to the charging position folded out. The boat looses then usually a speed of 0.1-0.5 knot. The magnitude of the speed loss may be adjusted through the control 14 schematically indicated. When the voltage generated by the electric machine exceeds for example about 4.5 volts the electronic unit 20 starts and the microprocessor unit 9 then controls the DC/DC-converter. The voltage generated by the electric machine 8 is continuously measured by the member 10, and the microprocessor unit 9 translates this voltage to a current set value according to the graph in FIG. 4. The microprocessor unit increases gradually the charging current until the current set value is obtained through a stepless changing of the up-transforming of the voltage from the electric machine. Thus, the actual voltage, above the threshold voltage, in the direct voltage machine is in the DC/DC-converter converted to battery charging voltage. The micro processor unit 9 is adapted to ensure a continuous adaptation of the charging procedure to the conditions prevailing, so that if the voltage out from the electric machine 8 sinks, the battery voltage is rapidly reduced so that a new calculated maximum current set value is obtained. When then a maximum battery voltage has been reached the charging current is controlled through the microprocessor unit 9 so that the maximum allowed battery voltage is not exceeded. It is not a matter of course that the actual maximum current set value is the optimum current output from the direct voltage machine, as a consequence of a number of circumstances, so that a Power Point-regulator in the micro processor unit, which continuously searches for the best combination of current and value for obtaining a maximum battery charging current to a minimum of braking moment, may be justified in many cases.

The electric direct voltage machine may preferably also be used as motor for propelling the boat, and the energy consumed may for example if the electric machine is driven in normal speed, in 5 minutes, be charged back if desired in about 20 minutes when sailing at 6 knots.

It is illustrated in the embodiment shown in FIG. 1 how the rotor of the electric machine is arranged directly on the axle upon which the propeller is arranged, but other alternatives are also conceivable, which are illustrated schematically in FIGS. 5-7. It is shown in FIG. 5 how a gear 15 is arranged to divide the axle between the propeller 2 and the electric machine 8 into a first axle part 16 connected to the propeller and a second axle part 17 connected to the rotor. This gear is of L- or S-type, and it may be with or without gear change.

FIG. 6 illustrates an alternative to the embodiment, which differs therefrom by being arranged with ability to be turned for enabling an adjustment of the propeller with respect to the extension of the boat, so that the propeller may be adjusted with respect to the driving direction, water currents and the like.

Finally, FIG. 7 illustrates an embodiment having a gear 15 and axle parts 16 and 17 arranged substantially in parallel with each other. This gear may be with or without gear change.

The invention is of course not in any way restricted to the embodiments described above, but may possibilities to modifications thereof will be apparent to a person with skill in the art, without departing from the basic idea of the invention as defined in the appended claims.

It would for example be well possible that the device is only used for charging the consumption batteries of the boat, and that the boat has another motor for propelling by means of a motor when this is desired or has such a motor as a complement to a propelling by means of the electric machine of the device while operating as motor. It is also possible to connect the electric motor through for example a tooth rim and possibly a gear change to a propeller axle connected to an Otto-motor. Electricity propelling, propeller charging and extra charging in combustion motor operation may then be obtained. It is neither necessary that the boat has any possibility to motor operation at all, even if such an alternative will probably seldom be accepted.

The invention claimed is:

1. A device for charging at least one electric battery (1) on board a boat (18), which comprises a propeller (2) adapted to be immersed into water through the movement of the boat driven to rotate an axle (3) and an electric direct current machine (8) connected to the axle and adapted to generate voltage to the battery for charging thereof upon rotation of the axle, characterized in that the device also comprises a DC/DC-converter (7) adapted to convert the voltage generated by the electric machine through the rotation of the axle to a higher voltage suited for charging the battery, a member (10) adapted to measure the voltage generated by the electric machine and a micro processor unit (9) adapted to control the DC/DC-converter on the basis of voltage data delivered by said member.

2. A device according to claim 1, characterized in that the micro processor unit (9) is adapted to calculate the maximum set value for the current out from the electric machine towards the battery on the basis of data concerning the voltage generated by the electric machine delivered by said member (10) and control the DC/DC-converter (7) to adjust the charging voltage to the battery for obtaining said maximum current set value.

3. A device according to claim 2, characterized in that it comprises members (11) for measuring the current from the electric machine and delivering information thereabout to the microprocessor unit (9).

4. A device according to claim 3, characterized in that the electronic unit (9) is adapted to compare the current value measured with the calculated maximum current set value and control the DC/DC-converter (7) in dependence of the result of this comparison.

5. A device according to claim 2, characterized in that it comprises a control (14) actuated by hand for adjusting the maximum current output from the electric machine (8) by adjusting said current set value to be within an interval for a given voltage delivered by the electric machine.

6. A device according to claim 1, characterized in that the microprocessor unit (20) is adapted to control the charging voltage to the battery (1) so that a maximum charging power is obtained.

7. A device according to claim 1, characterized in that the electronic unit (9) is adapted to turn on and turn off and activate the charging of the battery only if the voltage delivered by the electric machine (8) exceeds a threshold voltage value.

8. A device according to claim 7, characterized in that the threshold voltage value is higher than 3V.

9. A device according to claim 1, characterized in that it also comprises members (19) adapted to measure the voltage of the battery (1) and send information thereabout to the microprocessor unit (9), and that the electronic unit is adapted to control the DC/DC-converter (7) so that a predetermined overcharging level of the voltage on the battery is not exceeded.

10. A device according to claim 1, characterized in that the electric machine (8) is a permanent magnet motor.

11. A device according to claim 1, characterized in that it is adapted to charge one or more 12V-batteries (1).

12. A device according to claim 1, characterized in that the electric machine (8) can be driven as a motor for propelling the boat through energy from said battery (1).

13. A device according to claim 12, characterized in that it is designed for charging one or more electric batteries (1) integrated with or coinciding with batteries used for the overall supply of electrical energy to apparatuses on board the boat.

14. A device according to claim 1, characterized in that said propeller (2) is a so called folding-propeller, i.e., the propeller blades may be folded out and together for changing between a position, in which they co-operate with the water for transmitting power and a position without any such co-operation.

15. A device according to claim 1, characterized in that the microprocessor unit (9) is adapted to control the DC/DC-converter (7) to ensure that when charging through a folding propeller the propeller is difficult to fold together.

16. A device according to claim 1, characterized in that it comprises a straight axle between the propeller and the electric machine for direct driving.

17. A device according to claim 8, characterized in that the threshold voltage is lower than 8V.

18. A device according to claim 3, characterized in that it comprises a control (14) actuated by hand for adjusting the maximum current output from the electric machine (8) by adjusting said current set value to be within an interval for a given voltage delivered by the electric machine.

19. A device according to claim 4, characterized in that it comprises a control (14) actuated by hand for adjusting the maximum current output from the electric machine (8) by adjusting said current set value to be within an interval for a given voltage delivered by the electric machine.

20. A device according to claim 2, characterized in that the microprocessor unit (20) is adapted to control the charging voltage to the battery (1) so that a maximum charging power is obtained.

* * * * *